H. COLBURN & S. G. BROADBENT.
PROCESS OF MAKING FERTILIZER.
APPLICATION FILED OCT. 23, 1908.
986,623.
Patented Mar. 14, 1911.
3 SHEETS—SHEET 1.
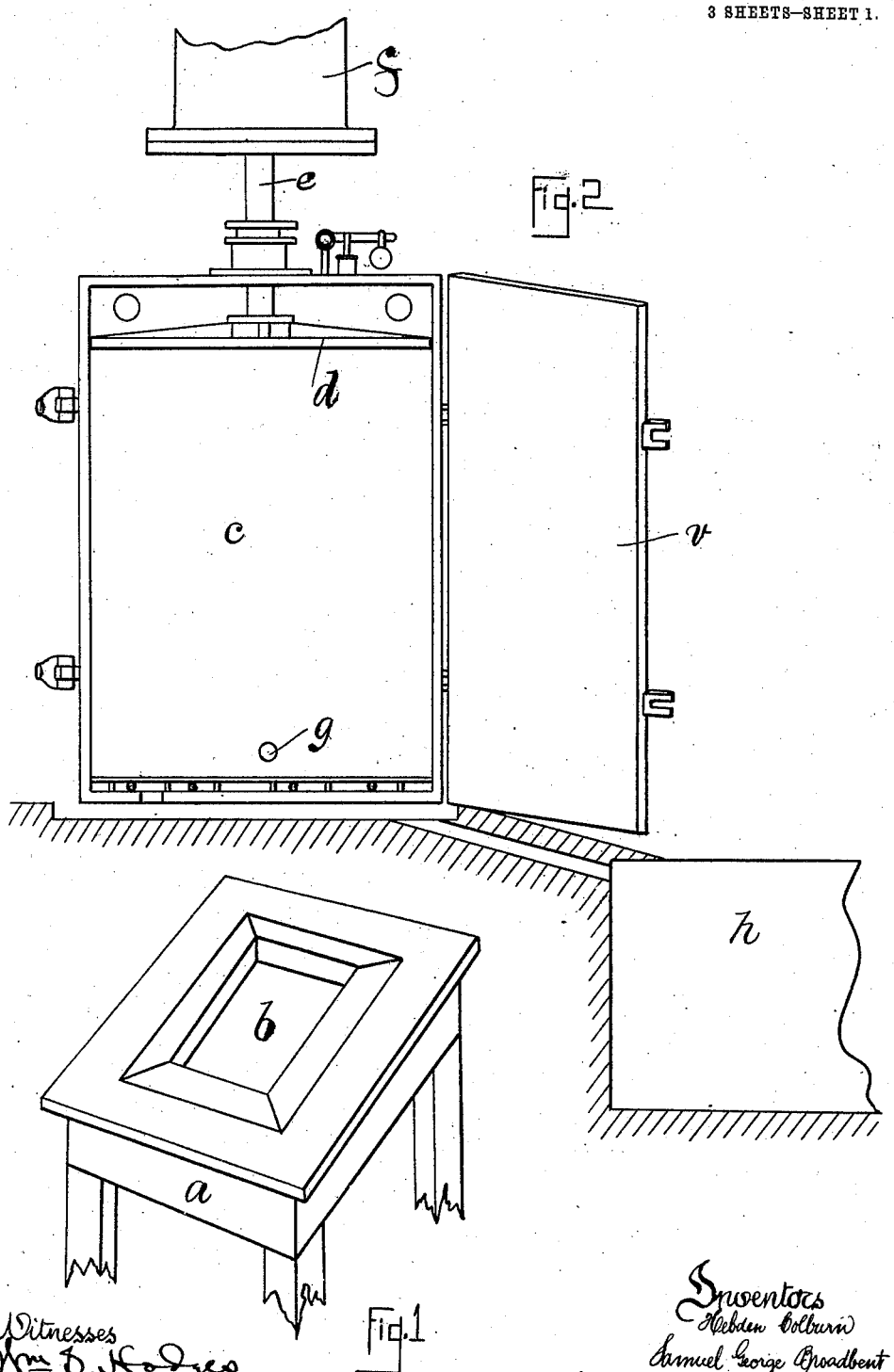

H. COLBURN & S. G. BROADBENT.
PROCESS OF MAKING FERTILIZER.
APPLICATION FILED OCT. 23, 1908.
986,623.
Patented Mar. 14, 1911.
3 SHEETS—SHEET 2.
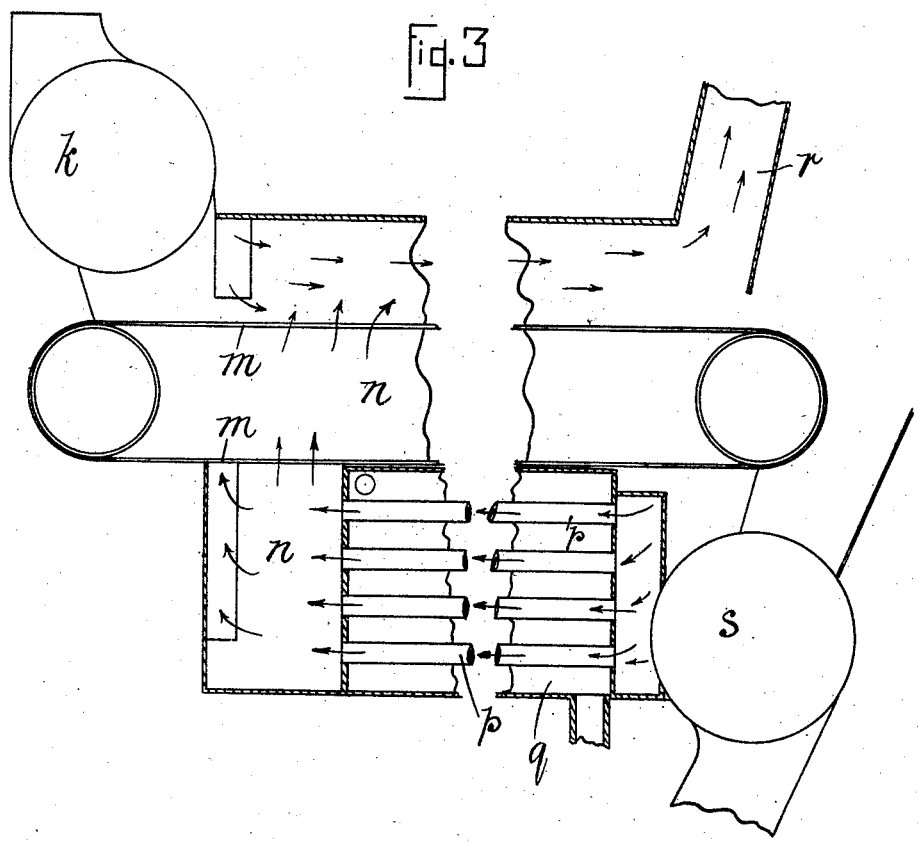

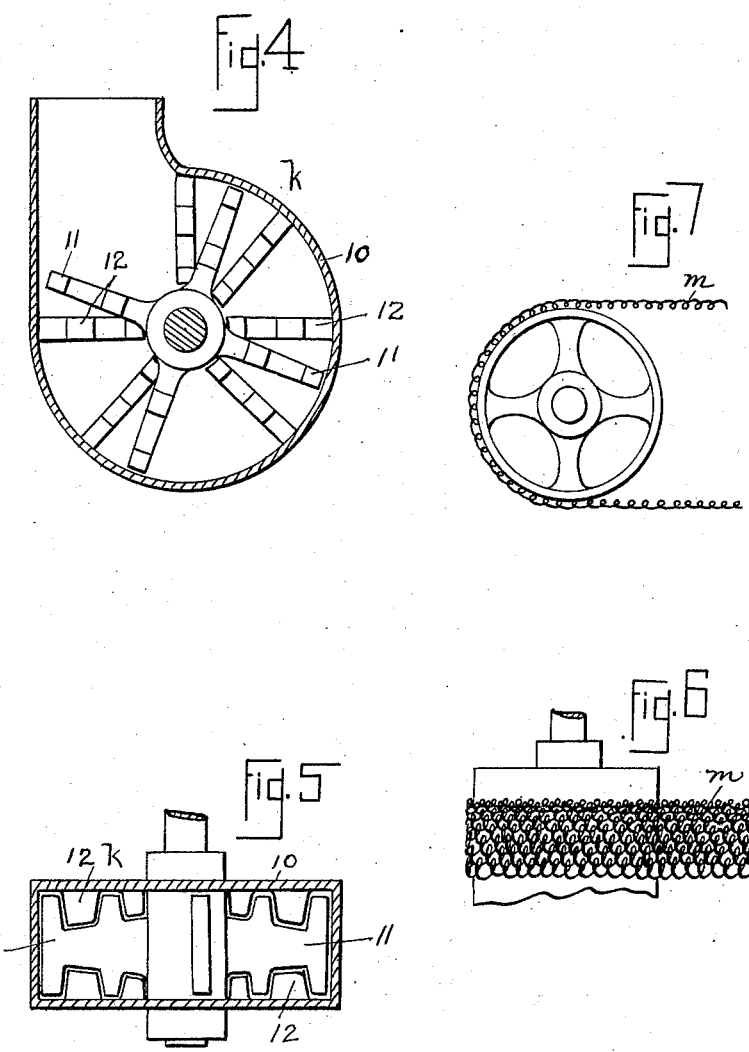

UNITED STATES PATENT OFFICE.

HEBDEN COLBURN AND SAMUEL GEORGE BROADBENT, OF BRADFORD, ENGLAND.

PROCESS OF MAKING FERTILIZER.

986,623.  Specification of Letters Patent.  Patented Mar. 14, 1911.

Application filed October 23, 1908. Serial No. 459,186.

*To all whom it may concern:*

Be it known that we, HEBDEN COLBURN and SAMUEL GEORGE BROADBENT, subjects of the King of Great Britain, and residents, respectively, of 6 Granville Terrace, Frizinghall, and 21 Pelham Terrace, Idle Road, both in Bradford, in the county of York, England, have invented a new, useful, and Improved Process of Making Fertilizer, of which the following description is a specification.

This invention relates to the treatment of animal and vegetable matter and particularly to the treatment of refuse from fish-markets and the like, so that the resultant substances are made useful as manure, while the fat and oil accompanying such refuse may be also collected; and our said invention consists in following such a process in the treatment of said substances that at comparatively little cost, all or the more valuable parts of said refuse is or are brought into useful condition.

The accompanying drawings are illustrative of certain of the apparatus which may be used in carrying out the treatment of substances in accordance with our invention, and said apparatus is shown to illustrate how our improved process may be carried into effect.

Figure 1 is a perspective view of a table with an attachment or with its upper surface formed as hereinafter explained. Fig. 2 is an elevation showing pressure applying devices and parts arranged in connection therewith for purposes hereinafter described. Fig. 3 is sectional elevation of drying and disintegrating apparatus with means for heating the air to be supplied to said drying apparatus. Fig. 4 is a horizontal section of the disintegrator. Fig. 5 is a vertical sectional view thereof. Figs. 6 and 7 are detail views illustrating the conveyer belt.

In accordance with our invention the refuse (which may be fish or other animal refuse, ordinary garbage, etc.) is preferably first taken and treated by a chopping or like machine, such as that described in British patent specification No. 16,997 of 1901, so that the hard substances, such as bone or the like, therein, are broken or cut up into fragmentary pieces or comparatively granulated, although we have found that this operation or part of the process is not at all times necessary since by increasing the pressure during subsequent treatment as hereinafter explained, these hard substances are at such time broken up as desired. When thus treated the whole (that is to say both the granular and pulpy matter) is taken and folded or wrapped in fabric or canvas of somewhat open texture and in sizes of suitable proportions to enable the bundles thus made to be placed within apparatus by which they may be subjected to pressure.

As means for facilitating the wrapping or bundling of the substances as above described we may have a table or the like $a$ upon the upper surface of which is formed the indented or recessed part $b$ so that on a canvas or fabric wrapper being placed over same it (the canvas) may be pressed down into the recess as it is having the substance placed upon it. Thus when the recess is filled by the canvas and substances placed over it, on the remainder being scraped away, the edges of the canvas may be folded over the contents, and in this manner the bundle, package or parcel is made of the desired size and by simple means which regulate their production of even or equal sizes. As before stated these bundles or packages are then subjected to pressure and the apparatus in which they are pressed is formed so that during or before or after the pressing operations the whole contents of such apparatus may be subjected to heat by the circulation of steam therein. The apparatus which we find to answer our purpose consists of the cylinder or box $c$ within which operates a piston or pressing plate $d$ actuated by a piston rod $e$ which derives its power from a cylinder $f$ wherein steam, water or other fluid or liquid under pressure is made to act to move said pressing plate $d$ as is from time to time required. The cylinder or box $c$ has a door or cover $v$ made removable therefrom to afford access to its interior, and said door or cover is made to fit sufficiently well against its seating to retain the solid parts of the substances within.

Steam under pressure is supplied from any suitable source to enter the cylinder or box $c$ as at or by the orifice $g$ so that by its circulation therein the contents may be heated.

On the desired quantity of substance or number of bundles of same being placed in the cylinder or box $c$, the door or cover is placed in position to retain same therein. Steam then is admitted so that the whole contents are boiled or heated to the temperature desired say by said steam being at a pressure of about 80 pounds to the square inch and for a period of say two hours when the contents of said box $c$ are about 54 cubic feet. After this action of the steam, the pressing plate is caused to descend with a pressure say of about 10 pounds to each square inch of its area. Its pressing actions are then arrested and the admission of steam thereto is further continued for a suitable period say of two hours for a box having the cubical contents above stated. On this second steaming action being completed the pressing plate is again forced down, this time with a pressure of say about 100 pounds to each square inch of its area so that the whole is finally compressed to force out as much as possible of the liquid matter. And by such pressure being again increased say to reach about 120 pounds to the square inch the hard substances therein are sufficiently broken up even although they have not been subjected to the chopping treatment first before described.

The liquid compressed out of the substances within the box $c$ escapes therefrom through the crevices surrounding the door or cover or through other openings made at or near the base of said box $c$ and is conducted to tanks, such as $h$, where it may remain for the heavier liquid to fall to the bottom of such tanks while the fat or oil will float on the top from which it is collected to be subsequently treated and refined in the well known manner for use in the arts. The solid matter left in the canvas coverings within the box $c$ is then removed therefrom and is taken from the canvas coverings and placed into disintegrating apparatus $k$ of any well known type so that any parts which may have been compressed or baked to form lumps, are thereby broken up and may then be deposited upon a traveling brattice or belt $m$ preferably of open wire work construction which carries it through a heated chamber $n$ to drive away any superfluous moisture left therein after the treatment above described.

In Figs. 4 and 5 inclusive we have shown a form of disintegrator $k$ which comprises the casing 10, and rotating blades 11 coacting with stationary blades 12.

The chamber $n$ is heated by air being passed through tubes $p$ extending through a steam heated space $q$ and said air is propelled therethrough by fans or other air propelling devices. The heated air on passing through the chamber $n$ to desiccate the substances therein, takes up the moisture and any gases or offensive odors which may arise from or be given off by said substances so that by conducting said gases as through the tubes or conduit $r$ to the furnaces of the steam generator or to other specially arranged furnaces, there to be burned or consumed by being mixed with the inflammable gases (the combustion of which it supports), all or any undesirable odor or germs that such heated air may contain are thereby destroyed. Or instead of thus burning the escaping air and gases we may conduct them to washing apparatus of any of the well known types at present in use for the washing of coal gas.

The desiccated solid matter as it leaves the traveling brattice or belt $m$ falls or is carried into apparatus $s$ (of any appropriate character such for instance as that illustrated in Figs. 4 and 5) for grinding or disintegrating it, after which it is filled into bags or the like ready for the market or for use as manure.

As our invention relates to a process we would have it understood that we are aware that many and varied modifications in the construction and arrangement of the apparatus may be made to carry out said process and that without departing from the nature of our invention.

Hence what we claim is:—

The process of treating animal and vegetable matter consisting in the preliminary disintegration of said matter, steaming the same and wrapping said matter into a plurality of bundles, subjecting the bundled matter to successively increasing degrees of pressure, and finally desiccating the compressed and steamed material.

In testimony whereof we have hereunto affixed our signatures in presence of two witnesses.

HEBDEN COLBURN.
SAMUEL GEORGE BROADBENT.

Witnesses:
FRED HAMMOND,
SAMUEL HEY.